(12) United States Patent  (10) Patent No.: US 8,238,606 B2
Sasaki  (45) Date of Patent: Aug. 7, 2012

(54) APPARATUS FOR IMAGE RECOGNITION

(75) Inventor: Mikio Sasaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 591 days.

(21) Appl. No.: 12/453,324

(22) Filed: May 7, 2009

(65) Prior Publication Data

US 2009/0279738 A1 Nov. 12, 2009

(30) Foreign Application Priority Data

May 8, 2008 (JP) ................................ 2008-122258

(51) Int. Cl.
*G06K 9/00* (2006.01)
*G06K 9/36* (2006.01)
(52) U.S. Cl. ....................... 382/103; 382/250
(58) Field of Classification Search .................. 340/903; 348/148; 382/103–105, 250
See application file for complete search history.

(56) References Cited

U.S. PATENT DOCUMENTS

| 5,748,775 A | 5/1998 | Tsuchikawa et al. |
| 2007/0047809 A1* | 3/2007 | Sasaki ........................... 382/170 |

FOREIGN PATENT DOCUMENTS

| JP | A-04-328689 | 11/1992 |
| JP | A-07-302328 | 11/1995 |
| JP | A-09-252467 | 9/1997 |
| JP | 11-341476 | * 12/1999 |
| JP | A-11-341476 | 12/1999 |
| JP | 2001-250118 | * 9/2001 |
| JP | A-2001-250118 | 9/2001 |
| JP | 2002-027449 | * 1/2002 |
| JP | A-2002-24986 | 1/2002 |
| JP | A-2002-027449 | 1/2002 |
| JP | 2002-197445 | * 7/2002 |
| JP | A-2002-197445 | 7/2002 |
| JP | A-2003-230134 | 8/2003 |
| JP | A-2003-288600 | 10/2003 |
| JP | A-2007-72987 | 3/2007 |

(Continued)

OTHER PUBLICATIONS

M. Sakai, Indexing of On-Board Captured Images Based on Color Information and Knowledge Processing, *IPSJ SIG Technical Report*, vol. 2006, No. 102 (AVM-54), pp. 45-52 (2006) (correspopnds to US 2007/0047809) (foreign language copy enclosed).

(Continued)

*Primary Examiner* — Vu Le
*Assistant Examiner* — Amara Abdi
(74) *Attorney, Agent, or Firm* — Posz Law Group, PLC

(57) ABSTRACT

An image recognition apparatus includes an image recognition unit, an evaluation value calculation unit, and a motion extraction unit. The image recognition unit uses motion vectors that are generated in the course of coding image data into MPEG format data or in the course of decoding the MPEG coded data by the evaluation value calculation unit and the motion extraction unit as well as two dimensional DCT coefficients and encode information such as picture types and block types for generating the evaluation values that represent feature of the image. The apparatus further includes an update unit for recognizing the object in the image based on the determination rules for a unit of macro block. The apparatus can thus accurately detect the motion of the object based on the evaluation values derived from DCT coefficients even when generation of the motion vectors is difficult.

13 Claims, 11 Drawing Sheets

FIG. 1

FOREIGN PATENT DOCUMENTS

| | | |
|---|---|---|
| JP | A-2007-107993 | 4/2007 |
| JP | A-2007-328435 | 12/2007 |

OTHER PUBLICATIONS

M. Sakai, et al., "Estimation of Driving Safety from On-Board Captured Scene by using Probe Image Database," *IEEE* (2007) (6 pages total) (English language copy enclosed).

Notification of Reason(s) for Refusal mailed Apr. 20, 2010 issued from the Japan Patent Office in the corresponding patent application No. 2008-122258 (and English translation).

Office Action mailed Jul. 13, 2010 issued in corresponding JP patent application No. 2008-122258 (English translation enclosed).

* cited by examiner

FIG. 4

| CATEGORY | VOCABULARY (OBJECT) |
|---|---|
| MOVING OBJECT | PEDESTRIAN, CAR, BICYCLE, ANIMAL, ··· |
| IMPERSONIFIED OBJECT | POSTER, TRAFFIC SIGN, TELEGRAPH POLE, MAILBOX, SIGNBOARD, ··· |
| HIDDEN/OVERLAPPING THING | NULL, ROADSIDE TREES, PEDESTRIANS, WALLS, VEHICLES, ··· |
| PEDESTRIAN BEHAVIOR | WALK, RUN, STAND UP, SIT DOWN, FALL, PETRIFIED, SQUAT, PUSH (LUGGAGE), PULL, BRING, CARRY, ··· |
| PEDESTRIAN POSTURE | STANDING POSTURE, SITTING POSTURE, ERECT POSTURE, FORWARD-TILTING, BACKWARD-TILTING, HANDS-RAISING, ··· |
| PEDESTRIAN SEX/AGE | MAN, WOMAN, UNCLEAR, INFANT, CHILD, JUNIOR HIGH SCHOOL STUDENT, HIGH SCHOOL STUDENT, ADULT, AGED, ··· |
| PEDESTRIAN FIGURE/CLOTHES | SMALL, MEDIUM, TALL, THIN, THICK, TROUSERS, SKIRT, ··· |
| BAGGAGE | NULL, UMBRELLA, BRIEF CASE, BAG, BACK PACK, CART, STROLLER, BICYCLE, ··· |
| GEOGRAPHIC INFORMATION/POSITION | A STATION, B ELEMENTARY SCHOOL, C INTERSECTION, ··· |
| SEASON/TIME/WEATHER | SUMMER, 8 AM, SUNNY, CLOUDY, RAIN, ··· |
| SCENERY INFORMATION | (SCENE CLASS) DOWNTOWN, MOUNTAIN, SEASHORE, EXPRESSWAY, ··· (OBJECT) SKY, BUILDING, ROADSIDE TREE, ROAD, ELEVATED STRUCTURE, LEAD VEHICLE, ··· |
| ROAD ENVIRONMENT | STRAIGHT, LEFT CURVE, RIGHT CURVE, UP, DOWN |
| DRIVING CONDITION (CAMERA MOTION) | STOP, STRAIGHT TRAVEL, RIGHT TURN, LEFT TURN, SLOW, BUMPING, ··· |
| DET OBJECT CLASS | RIGHT SIDEWALK, RIGHT LANE, CENTER LANE, LEFT LANE, LEFT SIDEWALK, ··· |
| POSITION/DIRECTION | FROM RIGHT, FROM LEFT, FROM CENTER |
| PEDESTRIAN DISTANCE | FAR, MEDIUM, NEAR, CLOSE, ··· |

FIG. 5

SITUATION PROFILE

| SITUATION INDEX | CERTAINTY VECTOR (TYPICAL VALUE FOR SITUATION CANDIDATES) |
|---|---|
| $L_1$ | $K_1(L_1), K_2(L_1), \ldots K_P(L_1)$ |
| $L_2$ | $K_1(L_2), K_2(L_2), \ldots K_P(L_2)$ |
| $\vdots$ | $\vdots$ |
| $L_Q$ | $K_1(L_Q), K_2(L_Q), \ldots K_P(L_Q)$ |

FIG. 10

| | | |
|---|---|---|
| MOVEMENT EVALUATION VALUE | SIZE OF MOVEMENT | $A_{MV}$ |
| | DIRECTION OF MOVEMENT | $D_{MV}$ |
| | ADJACENT V SIMILARITY | $SA_{MV}$, $SD_{MV}$ |
| | PANNING V SIMILARITY | $SA_{PA}$, $SD_{PA}$ |
| | ROAD DIRECTION SIMILARITY | $SD_{RD}$ |
| BASIC EVALUATION VALUE | ALTERNATE POWER COMPONENT | LAC |
| | LOW FREQUENCY POWER COMPONENT | LLF |
| COMPOUND EVALUATION VALUE | MBK LEFT COMPONENT | LAC_L, LLF_L |
| | MBK RIGHT COMPONENT | LAC_R, LLF_R |
| | MBK LOWER COMPONENT | LAC_D, LLF_D |
| | MBK UPPER COMPONENT | LAC_U, LLF_U |
| | MBK ENTIRE COMPONENT | LAC_A, LLF_A |
| | MBK COLOR COMPONENT | LAC_C, LLF_C |
| AREA EVALUATION VALUE | AREA SIZE | $S_{AR}$ |
| | AREA SHAPE | $F_{AR}$ |

APPARATUS FOR IMAGE RECOGNITION

CROSS REFERENCE TO RELATED APPLICATION

The present application is based on and claims the benefit of priority of Japanese Patent Application No. 2008-122258 filed on May 8, 2008, the disclosure of which is incorporated herein by reference.

FIELD OF THE INVENTION

The present disclosure generally relates to an image recognition apparatus that recognizes an object by using encode information generated in the course of encoding or decoding of an image performed by employing the motion-compensating prediction and the discrete cosine transform.

BACKGROUND INFORMATION

Conventionally, information on the motion of the object is regarded as important when the object is extracted from a motion picture that is captured by a camera in the vehicle or the like.

More practically, a method that calculates motion vectors for a unit of pixel blocks (e.g., a pixel block having 16×16 pixels), or a method that highly accurately detects the motion for every pixel has been used for image recognition. Those methods are disclosed in Japanese patent documents JP-A-H07-302328, and JP-A-2003-288600, for example.

When the motion information is calculated for a unit of pixel blocks, the extraction of pedestrian motion is difficult due to the smallness of the pedestrian image in the screen. That is, if the position of the pedestrian is relatively far and that makes the size of the pedestrian substantially same as or smaller than the size of the pixel block, the pedestrian image is small and motion vectors cannot be generated from the image of the pedestrian who is walking at a normal speed. As a result, the extraction of the pedestrian motion based on those motion vectors is difficult.

On the other hand, when the motion information is calculated for every pixel, a couple of problems are encountered, such as a signal-noise distinction problem due to the pseudo-motion of stationary objects caused by the camera movement and/or uneven brightness, or a calculation load problem that the detection of the pedestrian requires an huge amount of calculation. Further, maintaining consistency throughout the pixel-by-pixel processing of the detection method and the pixel block processing of the widely-used MPEG format may sometimes be difficult.

SUMMARY OF THE INVENTION

In view of the above and other problems, the present disclosure provide an apparatus that enables highly accurate object recognition of moving objects from an image even when the size of the object is approximately a size of a pixel block.

In an aspect of the present disclosure, the image recognition apparatus for recognizing an object by using encode information at one of image encoding and image decoding of image based on a motion-compensating prediction and a discrete cosine transform includes: an evaluation value calculation unit for calculating multiple kinds of evaluation values based on the encode information; and a determination unit for, according to a determination rule that defines relationships between (a) multiple objects that are to be extracted from an input image and (b) the multiple evaluation values that are calculated by the evaluation value calculation unit, determining, for each of the multiple pixel blocks, which one of multiple pixel blocks corresponds to which one of the multiple objects. In this case, the evaluation value calculation unit at least uses, as the encode information, a two dimensional DCT coefficients derived from the discrete cosine transform.

That is, if the object can be recognized in the playback image that is played back based on the encode information, that indicates that the encode information contains required amount of information for recognizing the object, and the evaluation value based on the encode information reflects the required amount of information.

Further, when the determination rule is selected, the rule is used by the determination unit to associate the evaluation values from the evaluation value calculation unit with the object to be extracted for each of the relevant pixel blocks.

That is, even when the object has the size of the macro block and the motion of the object is not reflected by the motion vectors, the object extraction is possible due to the changes in the two dimensional DCT coefficients.

The image recognition apparatus having the above operation configuration can detect the object having the size of the pixel block in a highly-accurate manner.

Further, the image recognition apparatus of the present disclosure can code the image data or can extract the coded data in the decode process for generating the evaluation values, thereby making it possible to generate information without substantially changing the conventional encoder/decoder. That is, only having the output terminal is required for generating the required information.

BRIEF DESCRIPTION OF THE DRAWINGS

Other objects, features and advantages of the present invention will become more apparent from the following detailed description made with reference to the accompanying drawings, in which:

FIG. 4 is a diagram which shows vocabularies for constructing a certainty vector in the embodiment;

FIG. 5 is a diagram which shows a structure of situation profiles in the embodiment;

FIG. 10 is a diagram of evaluation value types in the embodiment;

DETAILED DESCRIPTION

An embodiment of the present disclosure is explained in the following with reference to the drawings.

(System Structure)

Figure 1:
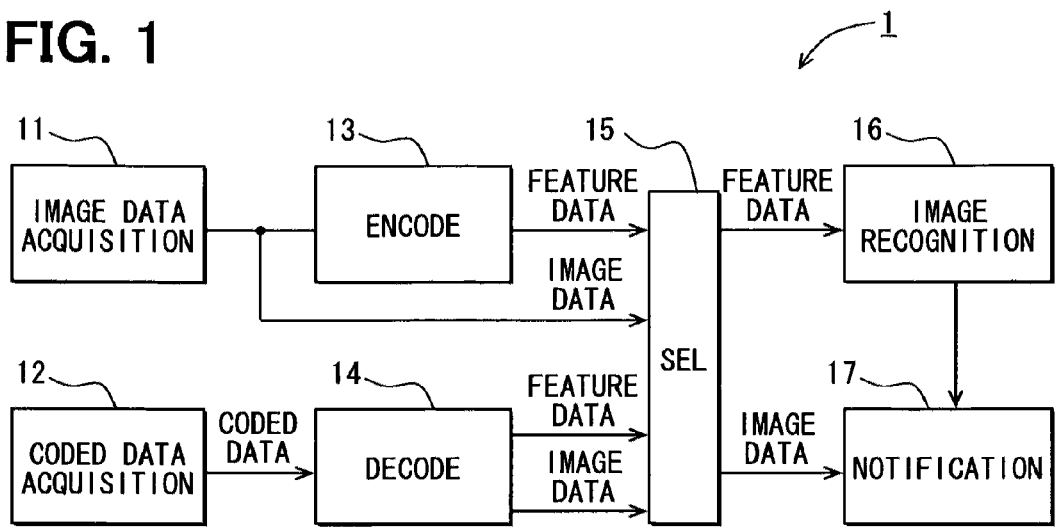
FIG. 1 is a block diagram which shows an entire structure of an electronic apparatus in an embodiment of the present disclosure.

FIG. 1 is about an electronic apparatus 1 for use in a vehicle that recognizes various objects including a pedestrian, in particular, based on acquired image information. The recognized object is then notified for the driver of the vehicle. The block diagram in FIG. 1 shows an overall structure of the electronic apparatus 1.

As shown in FIG. 1, the electronic apparatus 1 includes an image data acquisition unit 11 which acquires image data of a moving image derived from a camera in the vehicle, a coded data acquisition unit 12 which acquires coded data of moving image encoded in MPEG format (i.e., an MPEG-1 format in the present embodiment) from a stationary camera that images roads and other objects through wireless communication with a roadside device or the like, an encode unit 13 for coding the data from the acquisition unit 11 in MPEG format in order to output the coded data together with feature data (e.g., motion vectors, two dimensional DCT coefficients, encode information used for decoding the coded data), a decode unit 14 which decodes the coded data from the acquisition unit 12 in order to output the decoded image data by decoding together with the feature data that is acquired in the, course of decoding, a selector 15 which selectively outputs one of the image data and the feature data after acquisition of those data from the encode unit 13 and the decode unit 14, an image recognition unit 16 which performs object recognition processing and the like based on the feature data selected by the selector 15, and a notification unit 17 which notifies, with the displaying of the moving image, processing results by, for example, superposing an image that indicates the processing results on the moving image or by outputting a voice message of the processing results.

(Encode Unit)

The encode unit 13 divides the image to be coded into macro blocks having 16×16 pixels, and extracts the motion vectors that are indicative of relative special positions between the present macro block and the macro block in the previous frame that minimizes the difference of two blocks in a preset image area that centers around the present macro block.

In addition, the encode unit 13 generates a predicted image (i.e., a move prediction signal) on the basis of with the extracted motion vectors and the image in the previous frame, and, by applying the discrete cosine transform (DCT) to the difference between the predicted image (i.e., a predicted residue signal) and the image in the present frame in a unit block (8×8 pixels), six of which are defined in each macro block, generates the two dimensional DCT coefficient. The two dimensional DCT coefficient is then further processed to have quantization, zigzag-scan, and variable-length encoding of the image.

The six unit blocks in one macro block can be categorized into two groups as shown in FIG: 2. That is, a group of two unit blocks respectively representing entire macro block color differences U and V, and another group of four unit blocks respectively representing brightness of four divided areas of Y0 to Y3.

The encode unit 13 has a structure which is similar to the widely-known MPEG encoder.

However, the encode unit 13 has a difference from the widely-known MPEG encoder, in terms of generating outputs of the motion vectors and the two dimensional DCT coefficients respectively generated in the course of encoding in addition to the coded data and the encode information (e.g., an image type, an encode mode of the macro block etc.) used to decode the coded data.

Further, the image type which is included in the encode information includes an intra-frame (i.e.,an I frame), a prediction frame (i.e., a P frame) and an interpolation frame (i.e., a B frame), and the encode mode of the macro block includes "intra-block" and "non-intra-block."

The I frame is solely composed of the "intra-block" which is generated by applying the discrete cosine transform directly to the image (thereby having pixel values that are equal to zero or greater), which is intended to enable a playback of the moving image by a separate operation for each frame. Therefore, when the I frame is encoded by the encode unit 13, the encode unit 13 only outputs the two dimensional DCT coefficients from among the DCT coefficient and the motion vectors.

The P frame is represented as a transition from a previous I or P frame (i.e., a forward prediction), and the P frame is coded so that the image played in the previous frame can be used to play the image in the present frame.

The B frame is represented as an average of two I frames or two P frames that bind (i.e. precede and follow) the present frame (bidirectional prediction), and the forward motion vectors or the backward motion vectors are available. That is, the image in the present frame can be played by using either of the image played in the previous frame or in the subsequent frame.

Further, in the P and B frames, the "non-intra-block" is basically used. However, in case there are big changes between two frames (e.g., an abrupt motion of the object), which makes it economical to use the "intra-block" (i.e., the direct encoding) rather than using the "non-intra-block" (i.e., the motion-compensating prediction) in terms of electricity consumption, the "intra-block" is used for encoding.

Then, at the time of encoding of the "non-intra-block," there are four cases of output. That is, the output from the encode unit 13 is, (1) both of the motion vectors and the two dimensional DCT coefficient, (2) none of of the motion vectors and the two dimensional DCT coefficient (for example, no change from previous frame such as a solid portion of the background building at the time of stopping of the vehicle), (3) only the two dimensional DCT coefficient (for example, the size of the moving object is equal to or smaller than the size of the macro block), and (4) only the motion vectors (for example, a motion of the solid body that has few texture/color changes in front of an un-changing background).

(Decode Unit)

The decode unit 14 separates acquired bit-stream into the coded data and encode information (functional as a "parser"), generates the two dimensional DCT coefficient and the motion vectors by decoding the coded data according to the encode information, and plays the macro blocks by performing an inverse DCT and motion-compensation based on the generated two dimensional DCT coefficient and the motion vectors. The decode unit 14 then uses the played macro block as it is for image playback if the processed block is the "intra-block," or the decode unit 14 generates the image data by accumulating the difference information represented by the played macro block if the processed block is the "non-intra-block."

In other words, the decode unit 14 has a structure which is similar to the widely known MPEG decoder.

However, the decode unit 14 is different from the widely known MPEG decoder, in terms of outputs of the feature data generated in the course of decoding (i.e., the motion vector, the two dimensional DCT coefficient, and the encode information).

(Notification Unit)

The notification unit 17 has, together with other parts, a monitor for displaying the moving image based on the image data selected by the selector 15 as well as displaying, in a visual form, the recognition results by the image recognition unit 16 according to instructions from the image recognition unit 16, and a speaker 16 that notifies the recognition results in a vocal form.

The representation on the monitor may include, for example, an outline display that emphasizes the recognized objects, a color coding of the blocks that corresponds to the recognized objects, as well as arrow signs pointing the object positions and objects names of the relevant objects.

(Image Recognition Unit)

Figure 3:
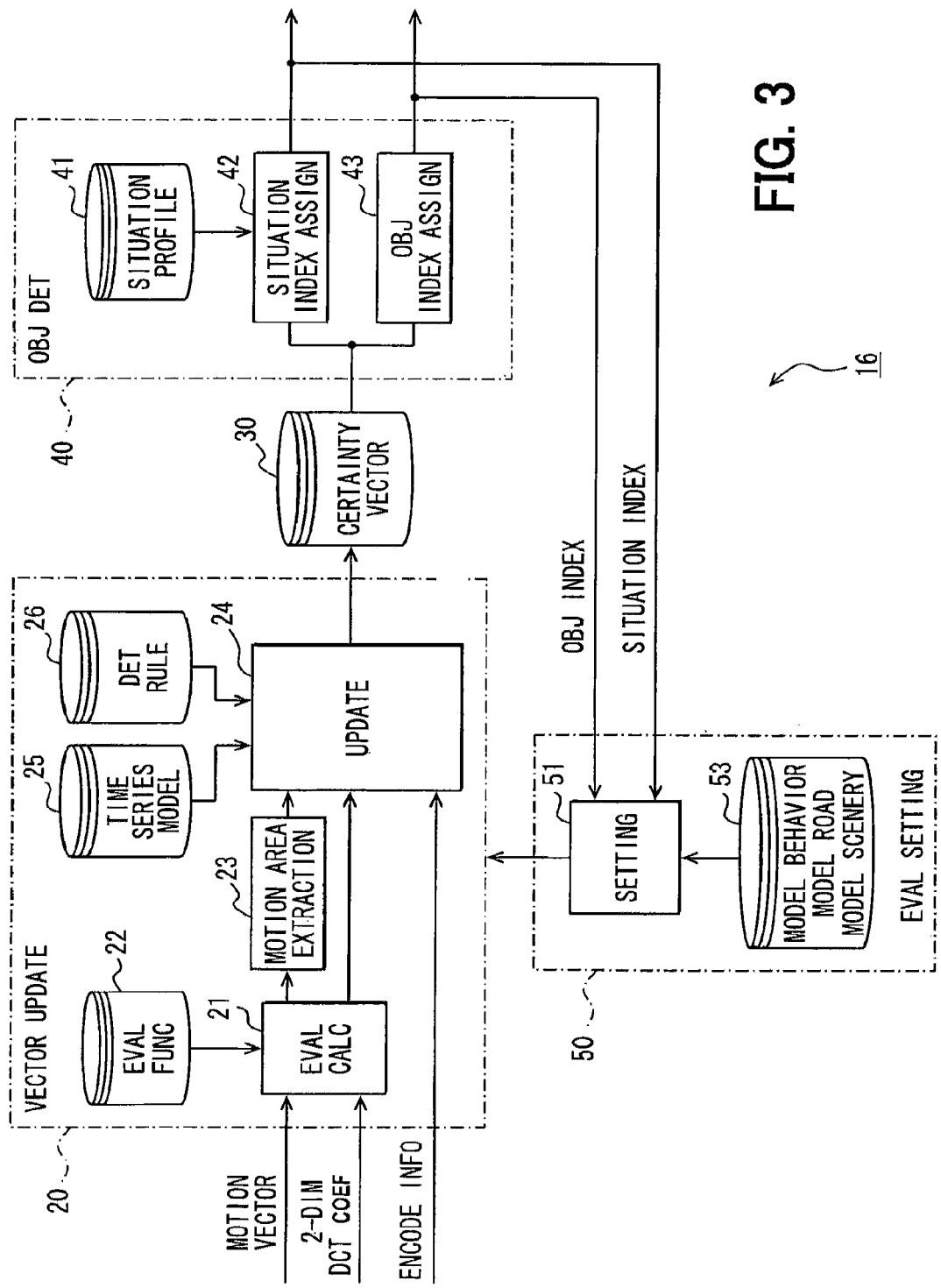
FIG. 3 is a block diagram which shows a detailed structure of an image recognition unit in the embodiment.

FIG. 3 is a block diagram of a structure of the image recognition unit 16.

As shown in FIG. 3, the image recognition unit 16 includes: a vector memory unit 30 which memorizes a certainty vector assigned to each of the macro blocks to be mentioned later, an object determination unit 40 which determines an object in the image and/or a situation of the image based on the certainty vector in the vector memory unit 30, an evaluation setting unit 50 which sets macro block evaluation methods and the like based on the determination by the object determination unit 40, and a vector update unit 20 which performs the evaluation of the macro blocks and the like based on the feature data from the selector 15 and the settings performed by the evaluation setting unit 50, as well as updating of the certainty vector memorized in the memory unit 30 according to the evaluation results.

(Certainty Vector)

The certainty vector K is a vector defined for each of the macro blocks represented by the following equation (1). That is, the certainty vector K has the dimension number of P, and has a certainty component $K_i$. More specifically, the certainty component $K_i$ ($i=1, 2$, to P) represents a certainty index that shows that a certain macro block is a portion corresponding to a vocabulary $O_i$ with a certainty of $K_i$, assuming that predetermined vocabularies of $O_1$ to $O_P$ respectively representing object names and object situations to be extracted from the image.

$$K = (K_1, K_2, \ldots K_P)^T \tag{1}$$

In FIG. 4, practical examples of vocabulary $O_i$ and categories for categorizing the vocabulary $O_i$ are shown in a table format. In the table of vocabularies, a vocabulary in the categories of "Moving Object," "Impersonified Object," "Baggage," and "Geographic Information/Position" represents the object name, and a vocabulary in other categories represents the object attributes and conditions.

(Object Determination Unit)

The object determination unit 40 in FIG. 3 has a profile memory unit 41 which memorizes situation profiles which are used to determine a situation concerning a specific object in the image on the basis of the certainty vector K.

The situation profiles are, as shown in FIG. 5, definitions of relationship between a situation index $L_j$, which identifies each of situation candidates $S_j$ ($=1, 2, \ldots Q$), and a typical value $K_i(L_j)$ (i.e., $K_1(L_j), K_2(L_j), \ldots K_P(L_j)$) of the certainty vector K, by predefining representative (i.e., frequently observed) situations $S_1$ to $S_Q$ of certain objects formed as combinations of vocabularies $O_i$.

The above definition is explained in the following, by using an example that the certain object is a pedestrian. That is, the situation candidates are itemized for the object "pedestrian." As shown in the following, the condition of the pedestrian as well as the attributes of the pedestrian (e.g., an aged person, an infant or the like) can be included in the situation candidates.

"(The pedestrian) walking on a sidewalk with a baggage borne on the shoulder"

"(The pedestrian) running into a roadway from the left"

"(The pedestrian) running into a roadway from behind a lead vehicle"

"An aged person (the pedestrian) slowly crossing a roadway"

"An infant (the pedestrian) being petrified in a roadway"

In addition, the object determination unit 40 has a situation index assign unit 42 and an object index assign unit 43. The situation index assign unit 42 selects and outputs one or more situation indices $L_j$ (i.e., the situation candidates $S_j$) from among the situation profiles memorized in the profile memory unit 41, based on a criterion that the typical value is similar to the certainty vector K according to the certainty vector K memorized in the vector memory unit 30, and the object index assign unit 43 divides a picture into objects (i.e., background areas and motion areas) by using a unit of the macro block and assigns the object index (i.e., the vocabulary $O_i$ indicative of the object name) to each of the divided areas based also on the certainty vector K memorized in the vector memory unit 30.

(Evaluation Setting Unit)

The evaluation setting unit 50 has a model memory unit 53 that memorizes behavior modes representing typical pedestrian behavior patterns, road models defining typical road shapes, and scenery models defining typical scenery patterns, and a setting process unit 51 that performs an evaluation contents setting process for setting an evaluation function used in the vector update unit 20, for setting macro block positions to be evaluated by the evaluation function, and for setting determination criteria and/or time series models respectively used for evaluating evaluation values from the evaluation function or the like.

(Model Memory Unit)

The behavior model memorized in the model memory unit 53 is a description of the behavior pattern of a specific object by associating, with each of the states in a state transition diagram, a vocabulary indicative of a condition of the specific object that belongs to a relevant category of the specific object.

For example, when the specific object is a solo pedestrian, as shown in FIG. 4, from among all categories, vocabularies belonging to the categories of "Pedestrian Behavior," "Pedestrian Sex/Age," and "Pedestrian Figure/Clothes" can be respectively used as an individual state in the state transition diagram which describes the behavior model of the solo pedestrian.

Figure 6:
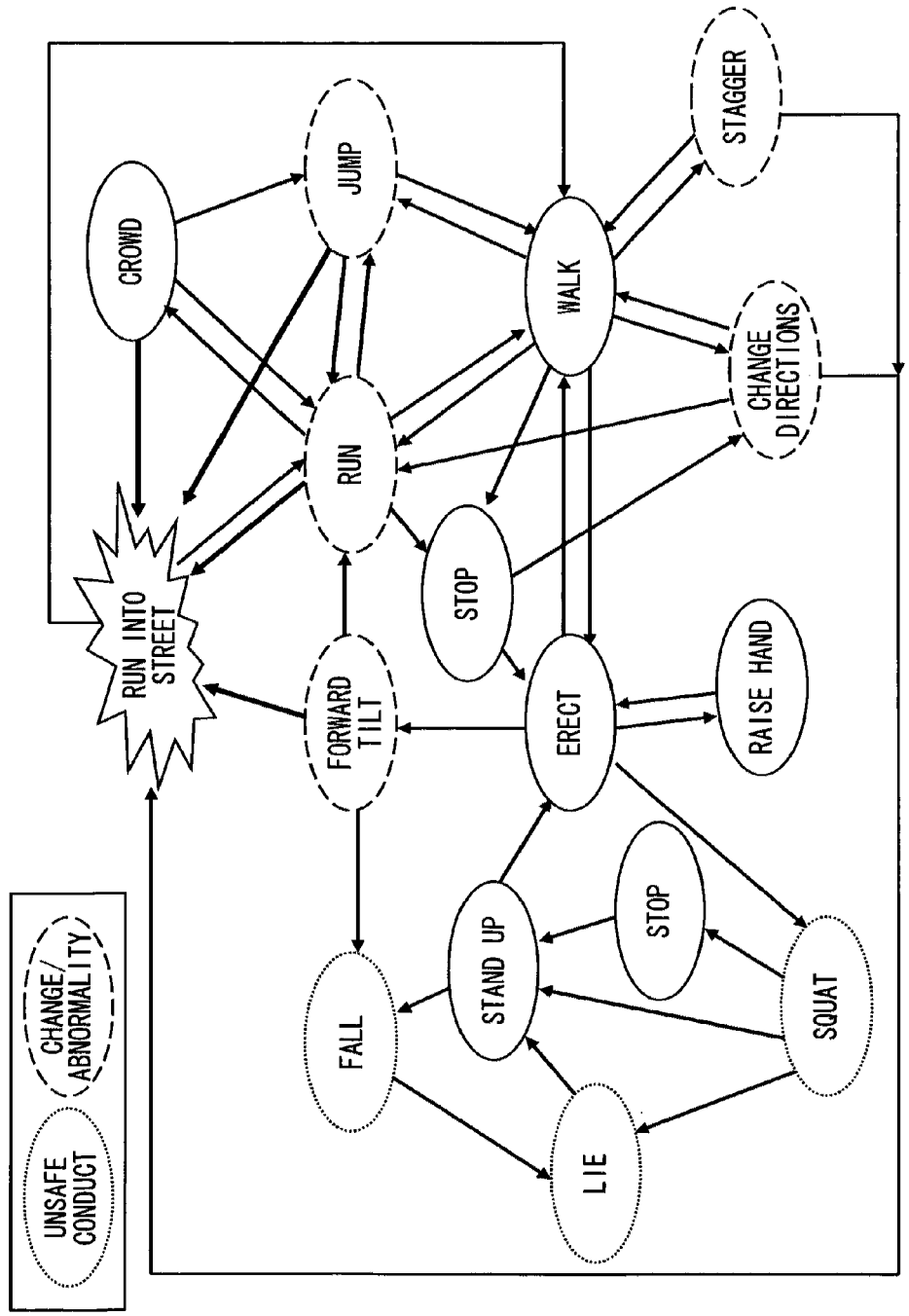
FIG. 6 is a state transition diagram which illustrates the contents of behavior models in the embodiment.

FIG. 6 is an illustration showing a portion of the behavior model regarding the solo pedestrian, and the behavior of the pedestrian is considered as a series of the states in the illustration. That is, for example, if the behavior of the pedestrian in the present frame is determined as a "Walk" state, the pedestrian behavior in the next frame should be determined as one of a "Run" state, a "Jump" state, a "Stagger" state, a "Change Direction" state, and a "Stop" state after possible transition from the state in the present frame.

The road model is a box shape model which represents a three dimensional structure around the road that serves as an imaging object of interest. The road model includes, for example, a straight road, a curve road, an intersection, an uphill slope, a downhill slope, and the like. Further, the scenery model is a scenery pattern that typifies stationary scenery frequently appearing in the picture that serves as processing object. That is, the scenery pattern includes a group of buildings, a garden city, a mountain road, an indoor parking and the like.

Furthermore, from among the categories shown in FIG. 4, the road model is selected by the vocabularies which belong to the "Road Environment," and the scenery model is selected by the vocabularies which belong to "Scenery Information." Moreover, regarding details of the road model and the scenery model, refer to, for example, disclosed in a patent document JP-A-2007-72987.

(Setting Process Unit)

Figure 7:
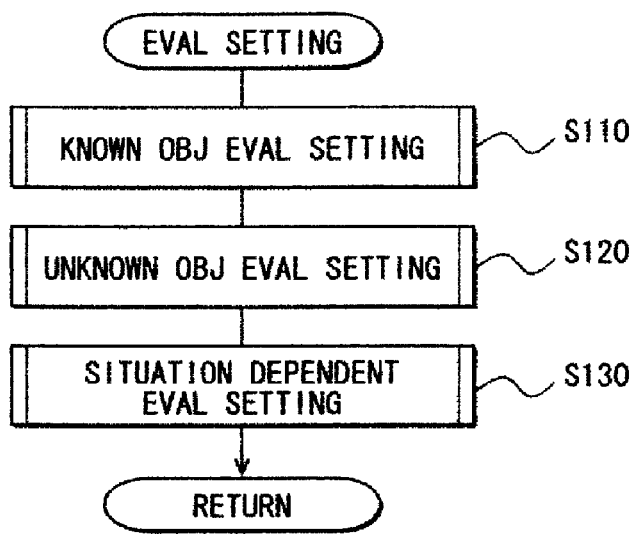
FIG. 7 is a flow chart which shows the contents of evaluation contents setting processing in the embodiment.

The evaluation contents setting processing performed by the setting process unit 51 is described in FIG. 7 with reference to the flow chart. The present processing is performed everytime determination results are output from the object determination 40. That is, when the frame is updated, the present processing is started.

When the present processing starts, as shown in FIG. 7, the process in S110 performs known object evaluation contents setting processing that sets, for known objects, an evaluation function and observation points (i.e., macro blocks to which the evaluation function is applied).

More practically, an object having the object index assigned by the object index assign unit 43, or the object corresponding to the vocabulary of object name from among the certainty vector K having a greater-than-the-predetermined-threshold certainty is extracted as the known object. Details of the determination rule are described later.

Next, for each of the extracted objects, an evaluation value used in a determination rule that is pre-associated with the object name of the known object is identified, and the evaluation function used to calculate the identified evaluation value is then identified.

Next, the observation points (e.g., a position, a size, a shape) to which the identified evaluation function is applied is identified based on the current position of the object and the movable range of the object that can be estimated from the name of the known object.

Further, when the known object is a pedestrian, the determination rules and the observation points may be filtered to have a narrow scope based on the situation of the pedestrian estimated from the situation index, the attribute (age and clothes etc.) of the pedestrian indicated by the object index, and the behavior model memorized in the model memory unit 53.

In other words, in S110, more detailed information as well as observation points and evaluation functions which are necessary in order to acquire more accurate information is set with regard to the known object.

In S120, unknown object evaluation contents setting processing is performed. The unknown object evaluation contents setting processing sets the evaluation functions and/or the observation points required for newly extracting the unknown object.

More concretely, based on the certainties of the vocabulary included in the "Road Environment" category and "Scenery Information" category from among all the certainty vectors K, the road model and the scenery model that are most matching with the scene in the present frame are selected, and the observation points and the determination rules pre-associated with the combination of the two models (road+scenery) are then identified, and the evaluation value used in the rule and the evaluation function for calculating the evaluation value is further identified.

Figure 8:
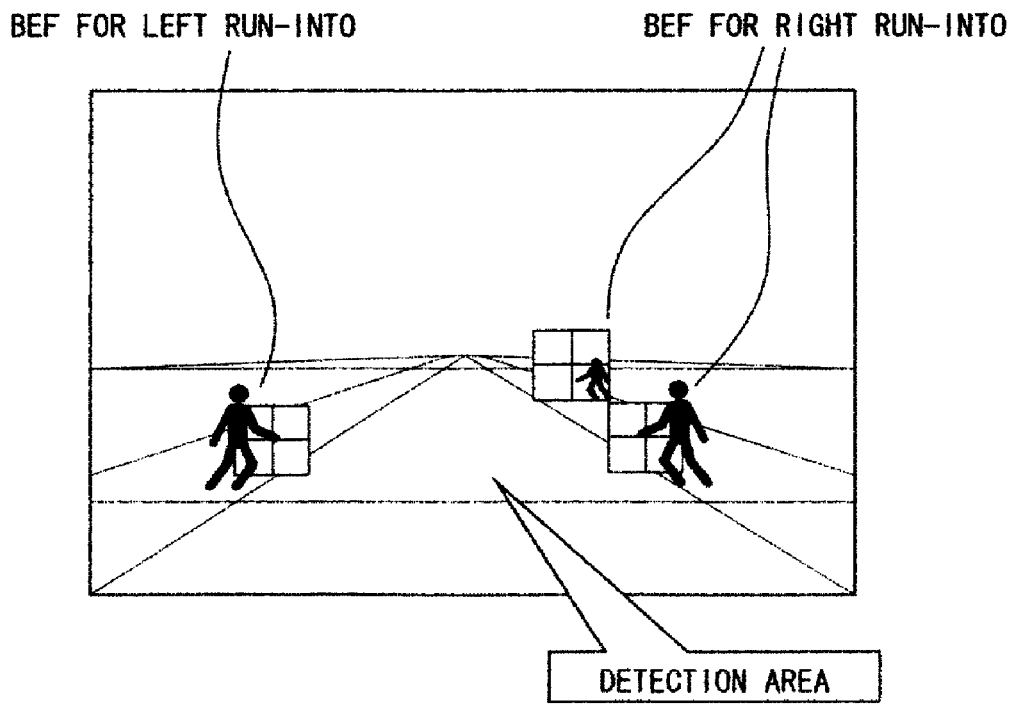
FIG. 8 is an illustration which shows setting of observation points based on scenery models and road models in the embodiment.

In other words, in S120 (unlike S110), the observation points and the evaluation functions used therein are set time after time according to the current situation. Therefore, for example, the position where the pedestrian is highly possibly found (e.g., the sidewalk, the pedestrian crossing or the like. Refer to FIG. 8) and/or the positions where the pedestrian may be highly possibly appearing (e.g., the boundary of the roadway and the sidewalk, the dead angle of a building/vehicle, an exit from a door/stairs, peripheries of the picture or the like) are set as the observation points.

In S130, the observation points and the determination rules which are pre-associated with the index $L_j$ are identified based on the $L_j$ (i.e., the situation candidates suitable for explaining the situation of the pedestrian in the current picture) assigned in the object determination unit 40, and then the evaluation value used in the determination rule and the evaluation function used to calculate the evaluation value are identified before concluding the present process.

In other words, in S130, required observation points determined by the inter-relationship of the multiple objects and the evaluation functions used therein are identified.

Furthermore, in this case, the observation points and the evaluation functions relevant to the situation index $L_j$ are configured to be newly set. However, the observation points and the evaluation functions set in S110 and S120 may be restricted according to the situation index $L_j$.

Figure 9A:
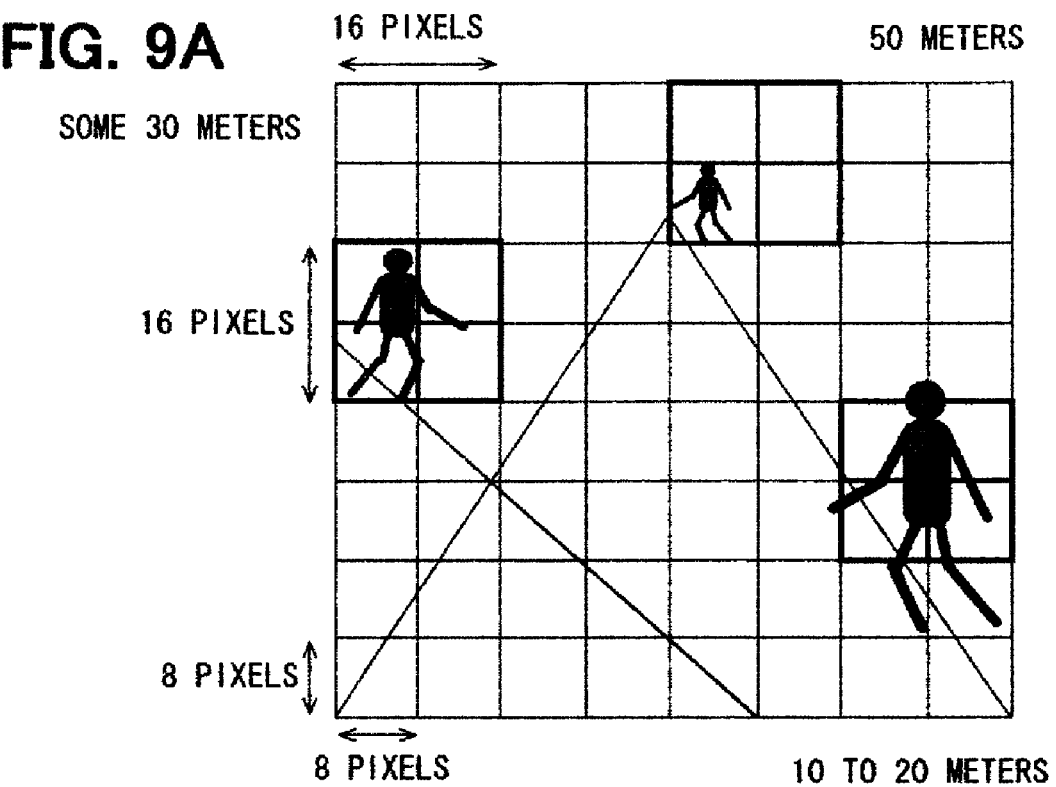
FIGS. 9A and 9B are illustrations which show sizes of the observation points according to distance and setting contents of shapes in the embodiment.
Figure 9B:
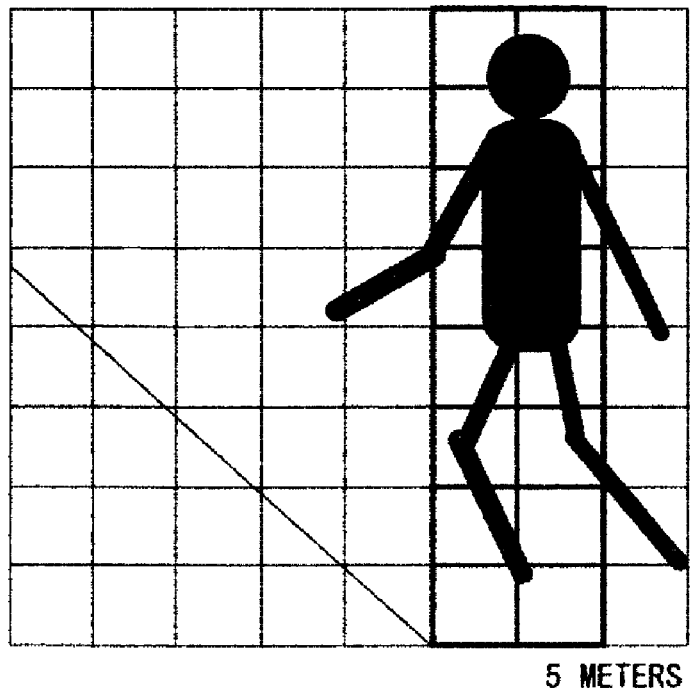

In addition, in either of S110 to S130, the sizes and shapes of the observation points are set, for a unit of the macro block, according to the size of the object that is expected to be observed at the observation point and according to the distance as well as other factors (Refer to FIGS. 9A and 9B).

(Vector Update Unit)

In FIG. 3, the vector update unit 20 extracts a motion area that are made up from successive macro blocks having similar motion, based on (a) the calculation by using an evaluation value calculation unit 21 and an evaluation function memory unit 22 storing the evaluation functions for calculating various evaluation values according to the motion vector and the two dimensional DCT coefficient and (b) the evaluation value generated from the motion vector, in consideration of the setting contents by the evaluation setting unit 50. The vector update unit 20 further includes-the following components. That is, a motion area extraction unit 23 for calculating various evaluation values of the extracted motion area, an update process unit 24 for updating the certainty vector K by using the determination rules and time series models specified by the setting unit 50 based on the evaluation values from the calculation unit 21 and the various evaluation values from the calculation unit 21 and extraction unit 23 together with the time series of the evaluation values, a pattern memory unit 25 for memorizing time series models (i.e., time series patterns for evaluation) that area used for evaluation of the time series pattern by the update process unit 24, and a rule memory unit 26 for memorizing the various determination rules for an update of the certainty vector K by the update process unit 24, are provided.

(Evaluation Value Calculation Unit)

The evaluation value calculated by the evaluation value calculation unit 21 includes (a) a motion evaluation value directly derived from the motion vector, (b) a basic evaluation value directly derived from the two dimensional DCT coefficient, and (c) a compound evaluation value derived from the evaluation function that defines evaluation value combination methods.

Among these values, the motion evaluation value consists of the following factors of (a) a macro block motion size $A_{MV}$ and a motion direction $D_{MV}$, for each macro block, (b) a motion size similarity $SA_{MV}$ and a motion direction similarity $SD_{MV}$ for each combination of two adjacent macro blocks (up/down/right/left), (c) similarity index $SA_{PA}$ (motion size) and $SD_{PA}$ (motion direction) indicative of the similarity with a panning vector generated by the camera movement for each of the macro blocks, and (d) a motion direction similarity $SD_{RD}$ relative to the direction of the road.

Further, motion evaluation values $A_{MV}$, $D_{MV}$, $SA_{MV}$ and $SD_{MV}$ are calculated by employing following equations (2) to (5), based on an X factor $v_x$ (a horizontal direction in a screen) and a Y factor $v_y$ (a vertical direction in a screen) of a motion vector v, two motion vectors $v_1$ and $v_2$ for similarity comparison, and a binding angle θ between the two vectors $v_1$ and $v_2$.

[Number 1]

$$A_{MV} = |v| = \sqrt{v_x^2 + v_y^2} \quad (2)$$

$$D_{MV} = \tan^{-1}\left(\frac{v_y}{v_x}\right) \quad (3)$$

$$SA_{MV}(= SA_{PA}) = 1 - \frac{||v_1| - |v_2||}{|v_1| + |v_2|} \quad (4)$$

$$SD_{MV}(= SD_{PA}) = \frac{1 + \cos\theta}{2} = \frac{1}{2}\left(1 + \frac{v_1 \cdot v_2}{|v_1| \cdot |v_2|}\right) \quad (5)$$

In addition, the motion evaluation values $SA_{PA}$ and $SD_{PA}$ are calculated by assuming that one of $v_1$ and $v_2$ in equations (4) and (5) is the motion vector and the other is the panning vector, and the motion evaluation value $SD_{RD}$ is calculated by assuming that one of $v_1$ and $v_2$ is the motion vector and the other is the orientation vector that indicates the road direction. For the calculation purpose, the panning vector and the orientation vector may be extracted from the image recognition process that is separately performed, or may be estimated from the travel condition of the vehicle.

In addition, all of the motion evaluation values $SA_{MV}$, $SD_{MV}$, $SA_{PA}$ and $SD_{PA}$ are normalized to have a value between 0 and 1. That is, when the sizes of the two motions match, or when the directions of the two motions match, the value becomes 1, and gradually reaches 0 as the difference increases.

In addition, the basic evaluation value consists of an AC power component value LAC and a low frequency power component value LLF.

Figure 2:
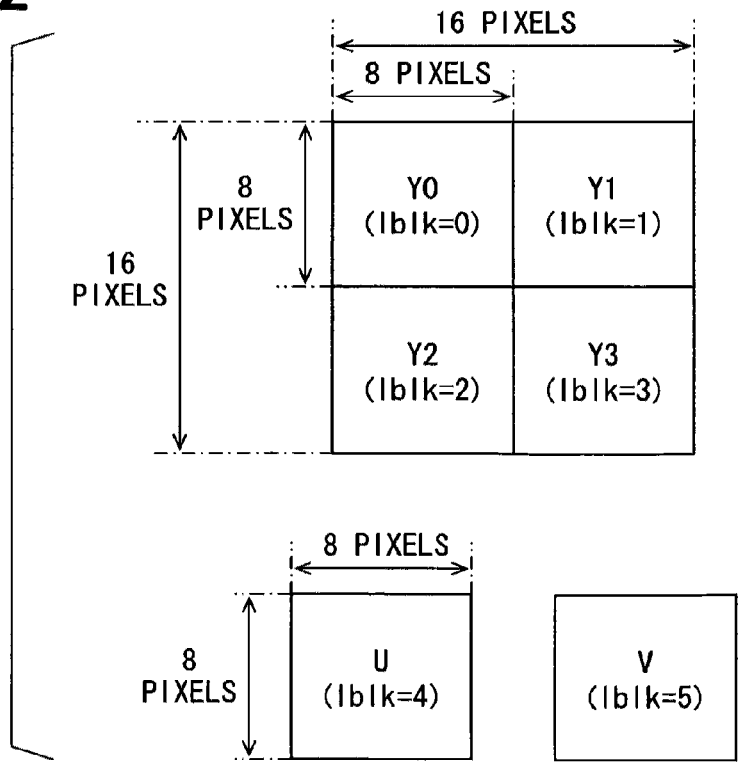
FIG. 2 is an illustration of units of macro blocks in the embodiment.

The basic evaluation values LAC and LLF are calculated by identifying six blocks in one macro block, that is, Y0 to Y3 and U, V by using the identifiers lblk (0 to 5) as shown in FIG. 2. That is, when the two dimensional DCT coefficient in the basic block of Lblk th order at the row m and column n (m, n=0 to 8) is represented as DCT(Lblk, m, n), the basic evaluation values LAC and LLF are calculated by employing equations (6) and (7).

[Number 2]

$$LAC(lblk) = \sum_{m,n} DCT(lblk, m, n) - DCT(lblk, 0, 0) \quad (6)$$

$$LLF(lblk) = \sum_{(m,n) \in L} DCT(lblk, m, n) \quad (7)$$

In the above equation, (m, n) ∈ L designates the low frequency component of the two dimensional DCT coefficient (for example, m, n=0 to 3).

In other words, the basic evaluation values LAC (Lblk) and LLF (Lblk) represent total sums of the both factors in the basic blocks, that is, the sum of AC factors and the sum of the low frequency power components.

On the one hand, the compound evaluation value serves as (a) an index for detecting (a) characteristics of motion in a single macro block, (b) an index for extracting of a representative characteristic of the single macro block, or (c) an index for extracting characteristics of an observation point that is made up of multiple macro blocks, beside other purposes.

As examples of evaluation functions for calculating the evaluation values, the following functions (8) to (13) that are applicable to the single macro block serving as the observation point are listed.

[Number 3]

$$LAC\_L = LAC(0) + LAC(2) \quad (8)$$

$$LAC\_R = LAC(1) + LAC(3) \quad (9)$$

$$LAC\_D = LAC(2) + LAC(3) \quad (10)$$

$$LAC\_U = LAC(0) + LAC(1) \quad (11)$$

$$LAC\_A = \sum_{lblk=0\sim4} LAC(lblk) \quad (12)$$

$$LAC\_C = LAC(5) + LAC(6) \quad (13)$$

The equation (8) is to detect the changes in the brightness components in two pixel blocks which are located on the left side in the macro block. For example, the appearance of the pedestrian or the like from the left of the macro block can be detected by using the equation.

The equation (9) is to detect the changes in the brightness components in two pixel blocks which are located on the right side in the macro block. For example, the appearance of the pedestrian or the like from the right of the macro block can be detected by using the equation.

The equation (10) is to detect the changes in the brightness components in two pixel blocks which are located at the bottom in the macro block. For example, the conditions of the feet of the pedestrian or the like in the macro block (many horizontal spectrum components are generated while walking) can be detected by using the equation.

The equation (11) is to detect the changes in the brightness components in two pixel blocks which, are located at the top in the macro block. For example, the conditions of the arms and the upper body as well as the head of the pedestrian or the like in the macro block (many vertical spectrum components are generated while walking) can be detected by using the equation.

The equation (12) is to detect the changes of the brightness components in the macro block as a whole, and the equation

(13) is to detect the changes of the color components in the macro block as a whole. For example, texture conditions can be detected by these equations.

The evaluation functions (8) to (10) serve as observation windows for observing the AC power components in the DCT spectrum in the macro blocks. By having these windows, various changes in the macro blocks can be extracted. These equations are so-called Block Edge Filters (BEF).

When the size of the object is similar to the size of the macro block, that is, even when the motion of the object cannot be easily reflected to the motion vectors, the two dimensional DCT coefficients are changed according to the motion of the object. The changes can, therefore, be detected by the equations (8) to (10). However, the object having the similar texture as the background sometimes makes the AC power components in, the DCT coefficient smaller. Therefore, only the AC power components are used in the BEF.

In addition, the above examples show that the evaluation functions use only the basic evaluation value LAC(lblk). However, the evaluation functions may use, instead of LAC (lblk), the LLF(lblk) or a combination of the LAC(lblk) and LLF(lblk) for calculating the compound evaluation value.

Further, when certain factors in the two dimensional DCT coefficient include object features to be extracted (e.g., type, behavior, attributes or the like), evaluation functions extracting the certain factors, or the evaluation functions suitably serving as the observation window that extracts a certain motion pattern in the observation point made up of multiple macro blocks may be additionally set and employed.

(Motion Area Extraction Unit)

The motion area extraction unit 23 extracts motion areas by considering that a pair of macro blocks fulfilling the equation (14) with the evaluation values $SA_{MV}$ and $SD_{MV}$ forms a single body (a single object). That is, the pair of macro blocks serves as the moving object for the purpose of extracting the motion area. The $TH_{SA}$ and $TH_{SD}$ are thresholds in the equation (14).

[Number 4]

$$SA_{MV} > TH_{SA} \text{ and } SD_{MV} > TH_{SD} \quad (14)$$

In addition, the motion area extraction unit 23 calculates, as an area evaluation value, an area size $S_{AR}$ and an area shape $F_{AR}$. Further, the area size $S_{AR}$ is counted and represented by the number of macro blocks in the motion area, and the area shape $F_{AR}$ is represented by using a shape index that is associated with a certain shape.

(Update Process Unit)

The update process unit 24 updates the certainty vector K prepared for each of the macro blocks by using the determination rules specified by the evaluation contents setting unit 50, based on the motion evaluation values $A_{MV}$, $D_{MV}$, $SA_{MV}$, $SD_{MV}$, $SA_{PA}$ and $SD_{PA}$, calculated by the evaluation value calculation unit 21, the basic evaluation values LAC(lblk) and LLF(lblk), the compound evaluation value LAC_X and LLF_X (X=L, R, D, U, A, and C), the area evaluation values $S_{AR}$ and $F_{AR}$ calculated by the motion area extraction unit 23, and the encode information regarding the frame and the macro block that are to be processed. In this case, the total sum of the certainty values in one certainty vector is configured to be equal to the value of one.

In addition, the update process unit 24 evaluates each of the evaluation values by comparing the values with thresholds or by determining that the values are within a certain range. The evaluation of those values may also be carried out by determining that the similarity of the patterns of the time series of the evaluation values to the model of the time series is above the threshold, or by determining that the pattern is most close to a certain model.

In addition, other than the above-described methods, differential values (difference between the present value and the previous value) of each of the evaluation values as well as integral calculus values, mean values of couple of previous values and the patterns of those previous values may be used for evaluation.

Further, for example, when the behavior of the pedestrian is extracted by making use of the time series pattern of these evaluation values, respectively different time series models are prepared for each of the vocabularies in the categories "Pedestrian Behavior" and "Pedestrian Posture" in FIG. 4. Furthermore, even for the single time series model applied to the vocabularies in "Pedestrian Behavior," respectively different models are prepared for each of the vocabulary categories "Pedestrian Sex/Age" and "Pedestrian Figure/Clothes."

The time series model is generated, for example, by statistically examining the evaluation value and size/shape of the object when the vehicle is stopping (i.e., the panning vector=0). That is, the two dimensional DCT coefficients extracted in the "non-intra-block" at the time of stopping correspond to the background difference, and enable the extraction of the motion of the object only, regardless of the background.

In addition, the update process unit 24 varies, according to a picture type of the picture under processing, the threshold values used to determine whether or not the evaluation values calculated based on the two dimensional DCT coefficients of the "non-intra-block" are significant (i.e., whether or not it is appropriate to raise the certainty of the corresponding vocabularies).

That is, the MPEG format has the frame structure (GOP: Group Of Pictures) that is arbitrarily set. The frame structure generally used has a unit of 15 frames, that is, a frame structure of IBBPBBPBBPBBPBB (I, B, P respectively represent an I frame, a B frame, and a P frame). The unit having the 15 frames is repeated. In addition, the evaluation values based on the two dimensional DCT coefficients of "non-intra-block" are used only in the P and B frames.

Designating (a) a determination threshold for an estimated difference of one frame interval as TH1, (b) a frame interval required for the estimation of P frame as NP, and (c) a frame interval required for the estimation or interpolation of B frame as NB, and assuming that the magnitude of the estimated difference of the pixel values is in proportion to the number of frames, a determination threshold THP used in P frame is calculated by a following equation (15), and a determination threshold THB used in B frame is calculated by a following equation (16). Then, if we put that α=NP and β=NB, the equations (15) and (16) are, $$THP = \alpha \times TH1 \quad (15)$$

$$THB = \beta \times TH1 \quad (16),$$

and the determination thresholds THP and THB have a relationship represented by a following equation (17).

$$THP = (\alpha/\beta) \times THB \quad (17)$$

In other words, when the determination threshold THB in B frame is set concerning a certain evaluation value, the determination threshold THP in P frame can be set to α/β time of the THB, or conversely, the determination threshold THP in P frame is set first and the determination threshold THB in B frame is set to α/β time of the THP.

More concretely, in the above frame structure, if the electricity power value indicative of the magnitude of the DCT coefficient (leading to the estimated difference) is represented by the sum of the absolute values, $\alpha/\beta$ becomes 2 (as $\alpha=3$, $\beta=1.5$). If the sum of square values instead of the sum of the absolute values is used, $\alpha/\beta$ becomes 3.6 as $\alpha=9$, $\beta=2.5$ (because $\alpha$ is derived from $NP^2$, and $\beta$ is derived from the average of the sum of squares of NB=1 and squares of NB=2. In this case, $\beta$ serves as a simple (arithmetic) average of frame intervals in the calculation method of the three different motion compensation differences in B frame.

Furthermore, the optimum value of the $\alpha/\beta$ may be different from the above theoretical values. In case that more adaptive setting of $\alpha/\beta$ is desired, the situation is classified according to scene classes, background objects, travel speeds and the like, and $\alpha/\beta$ is calculated statistically in each of the classified cases. The statistical methods include "multivariate regression analysis," "neural network," "support vector machine" and the like. Further, instead of calculating $\alpha/\beta$, the determination thresholds THP, THB themselves may statistically be calculated.

(Determination Rule)

The determination rules used by the update process unit 24 for processing the feature data in P/B frames are explained in the following.

First, the basic determination rules which are applied for the unit of the macro block are shown as items (A1) to (A5). In the following, the macro block to be processed is designated as an object MBK.

(A1) If the object MBK is an "intra-block," the certainty of the background is decreased and the certainty of moving object is increased.

(A2) If the coordinates (m, n) of the object MBK indicate an "impossible" object position based on the 3-dimensional relationship in association to the road model and the scenery model, the certainty of that object is decreased.

(A3) If the object MBK under evaluation of the motion evaluation value $A_{MV}$ has a travel speed that exceeds an upper limit of the travel speed of the object, the certainty of that object is decreased.

(A4) If the compound determination value LAC_X of the object MBK is smaller than a threshold, the certainty of the background is increased. If the value LAC_X exceeds a threshold, the certainty of the moving object is increased.

(A5) If the motion evaluation values $SA_{PA}$ and $SD_{PA}$ of the object MBK (i.e., similarity to the panning vector) are high, the certainty of the background is increased. If those values are low, the certainty of the moving object is increased.

Next, based on the motion area extracted by the motion area extraction unit and determinations for each of the macro blocks, the macro block that is determined as the moving object with higher possibility (the motion area of single macro block) is processed by using the following rules (B1) to (B3).

(B1) If the area size $S_{AR}$ of the motion area is in an inside of a tolerance range of the object which is observed, the certainty of the object being observed is increased.

(B2) If the area shape $F_{AR}$ of the motion area resembles a specific geometric shape model, the certainty of the object that corresponds to that geometric shape model is increased.

(B3) If a time series pattern of various evaluation values regarding the motion area resembles a specific time series model, the certainty of the object that corresponds to that time series model is increased. In this case, note that the evaluation values regarding the motion area include the compound evaluation values of adjacent macro blocks which adjoin the motion area in a specific manner.

In the following, the determination rules are explained in a more practical manner.

(a) Determination rules applied to vehicle

Similarity $SD_{RD}$ of the motion vectors with the road direction is high.

The size $A_{MV}$ of the motion and the direction $D_{MV}$ of the motion continuously change.

Time change of the motion area, shape $F_{AR}$ is small.

AC power components LAC(lblk) and LAC_X in the motion area as well as the time change of those factors are small.

(b1) Determination rules applied to pedestrian (mainly used in case that the area size $S_{AR}=1$)

AC power components LAC(lblk) and LAC_X in the motion area as well as the time change of those factors are large.

Basic evaluation values in the motion area, or the time series pattern of the compound evaluation values resembles the time series model peculiar to a certain pedestrian (i.e., a pedestrian having a specific attribute/showing a specific behavior).

(b2) Determination rules applied to pedestrian (mainly used in case that the area size $S_{AR}>1$)

The size of the motion $A_{MV}$ is smaller than the upper limit of the pedestrian.

Area evaluation values $F_{AR}$ and $S_{AR}$, or the time series pattern of those values resembles the time series model peculiar to a certain pedestrian (i.e., a pedestrian having a specific attribute/showing a specific behavior).

(c1) Determination rules for detecting a "dangerous" pedestrian (mainly used in case that the area size $S_{AR}=1$)

AC power components LAC(lblk) and LAC_X in the motion area, or the time change of those factors are abnormally large, or are substantially different from the time series model of the walking pedestrian.

(c2) Determination rules for detecting a "dangerous" pedestrian (mainly used in case that the area size $S_{AR}>1$)

The size $A_{MV}$ of the motion and the direction $D_{MV}$ of the motion change in-continuously.

Time change of the motion area shape $F_{AR}$ is substantially different from the walking pedestrian.

Furthermore, the "dangerous" pedestrian indicates that the behavior of the pedestrian that is unnatural and is leading to the abnormal behavior. For example, a large movement, an abrupt direction change or the like that is substantially different from a "normal" pedestrian.

Further, more complicated determination rules may be used. That is, by combining the different evaluation values, more elaborated rules may be defined. For example, "Stop of a pedestrian in a roadway area" can be detected by using the following equation (18), because the AC power component generation drastically decreases at the time of stop of the pedestrian. By using a differential value D of the AC power components LAC_A, the determination rule for determining the stop of the pedestrian in the roadway can be formulated.

[Number 5]

$$D>0 \text{ and } LAC\_A > TH_{STOP} \tag{18}$$

In addition, if "a pedestrian moving across a roadway at the time of travel of the vehicle" is a desired detection object, the following equation (19) can be used. This is because, (a) the low frequency power components of the macro blocks corresponding to the same object (i.e., the colors and contrasts) are typically continuous in successive frames, and (b) the similarity of the motion vector $v_{MBK}$ corresponding to the pedestrian to the panning vector $v_F$ at the time of the travel of the vehicle is low.

Based on the above assumption, by using Wv (a load factor), N (the number of DCT coefficients (lblk, m, n) used to calculate the low frequency power component LLF), the following equation (19) can be used as the determination rule.

[Number 6]

$$EP = w_v |v_F - v_{MBK}|^2 + \frac{1}{N} \sum_{lblk} LLF(lblk)^2 \qquad (19)$$

Figure 11:
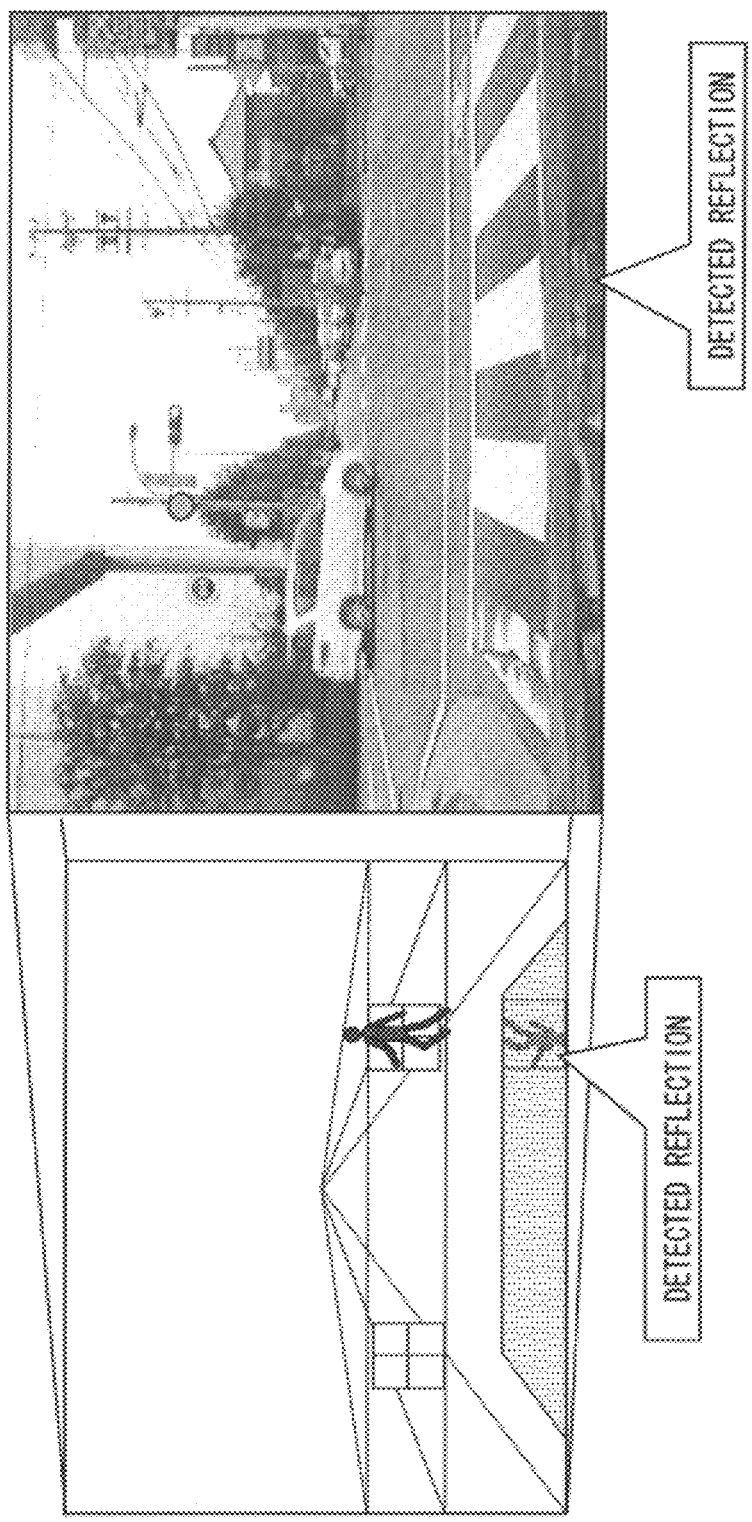
FIG. 11 is an illustration which shows a reflection of an object in the embodiment.

Furthermore, the update process unit 24 utilizes, as shown in FIG. 11, a virtual image of the object for updating the certainty vector, if:

(a) a reflective object (e.g., a body (=a bonnet, or an engine hood) of the subject vehicle and/or a leading vehicle, a curve mirror, a wall of a building or the like) exists in a view of the vehicle camera, and (b) the reflective object is reflecting the object. That is, the object being observed is reflected on the body/mirror/wall in the captured image.

More concretely, if a real image corresponding to the virtual image is already detected, the certainty of existence of the real image in the macro blocks that should contain the real image is increased.

Further, if only the virtual image is detected, the real image is considered as being hidden by an obstacle (e.g., a leaf, a dirt, a fog on the windshield or the like).

Further, if only the real image is detected without detecting the virtual image at a position that is supposed to reflect the virtual image, the certainty of existence of the real image is decreased based on an assumption that the real image may possibly be a noise.

Figure 12B:
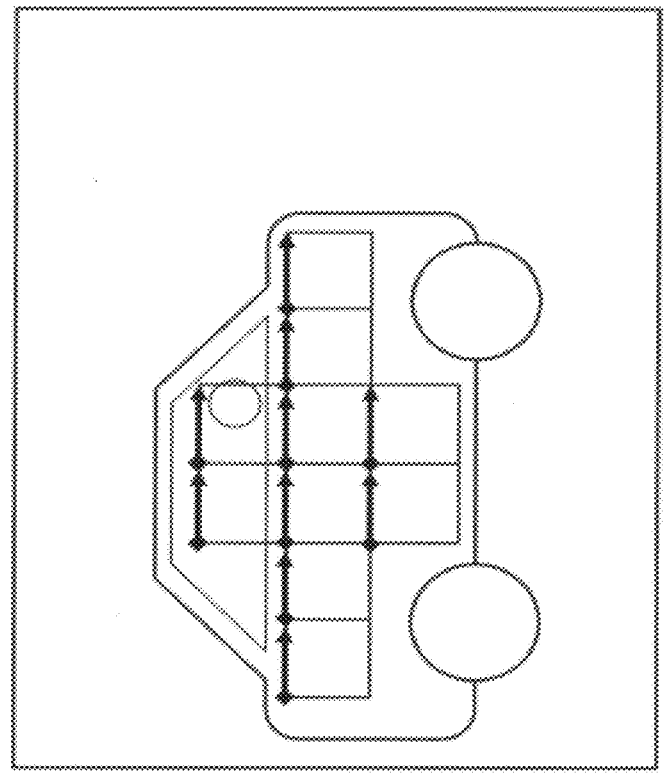
FIGS. 12A and 12B are illustrations which show motion vectors and two dimensional DCT coefficients generated in the macro blocks at a portion of vehicle image in the embodiment.
Figure 12A:
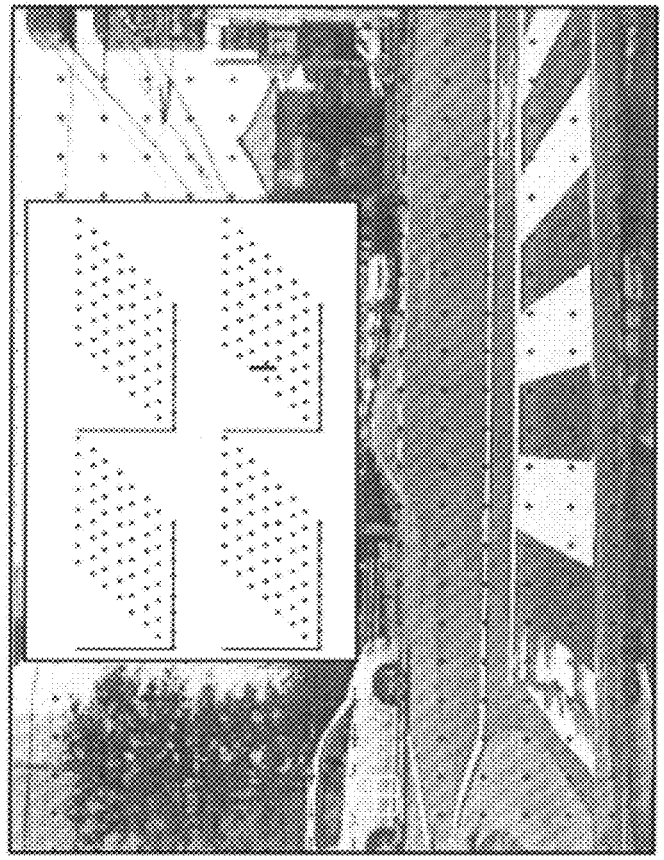

FIG. 12A shows an illustration of a situation where the motion vectors and the two dimensional LDCT coefficients are generated based on the real image. The dots and the arrows in the image show the motion vectors generated for the macro blocks, and a three dimensional graph having a black background and superposed on the real image shows generation of the two dimensional DCT coefficients in each of the macro blocks on the vehicle body in the real image.

From FIG. 12A, it can be concluded that the motion vectors are generated for the area that represents the vehicle, with very few DCT coefficients generated for the body portion (e.g., doors and a side body) that has a monotonous texture. Further, FIG. 12B shows that similar motion vectors are generated from the macro blocks on the same vehicle.

Figures 13A, 13B, 13C, 13D:
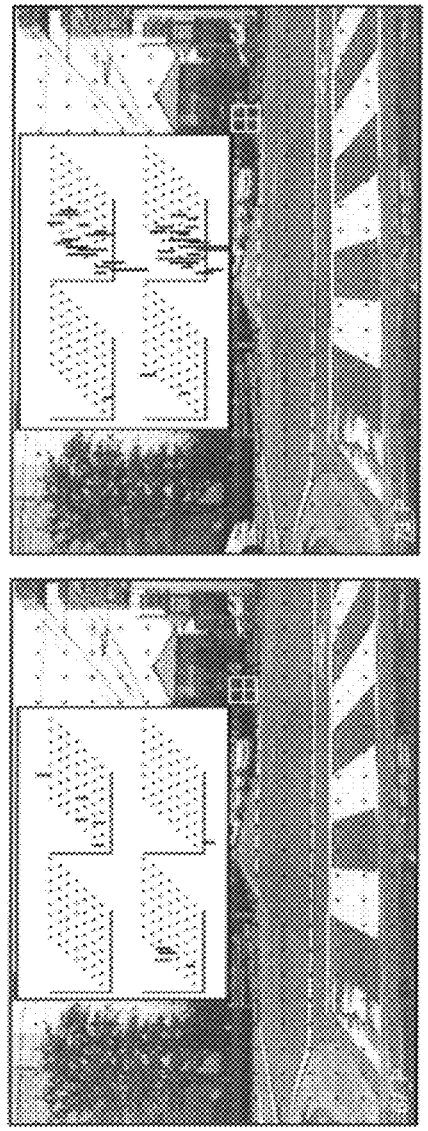
FIGS. 13A to 13D are illustrations which show motion vectors and two dimensional DCT coefficients generated in the macro blocks at a portion of pedestrian image in the embodiment.

FIGS. 13A to 13D show an example of the generation of the motion vectors and the two dimensional DCT coefficients in the macro blocks which are located at a position (i.e., an observation point) where a pedestrian is going to pass through in the real image. That is, (a) FIG. 13A is a situation where the pedestrian is about to enter the observation point, (b) FIG. 13B is a situation where the pedestrian has just entered the observation point, (c) FIG. 13C is a situation where the pedestrian is passing the observation point, and (d) FIG. 13D is a situation where that the pedestrian is about to pass through the observation point.

From FIGS. 13A to 13D, it is apparent that (a) the DCT coefficients, the AC factors in particular, are generated when the pedestrian exists, and (b) the generation of the DCT coefficients in the four basic blocks in one macro block is drastically changed according to the position of the pedestrian in the macro block. That is, in other words, various situations of the object that takes the size of the macro block can be detected by using BEF.

(Advantageous Effects)

As described above, the electronic apparatus 1 for use in a vehicle utilizes the motion vectors, two dimensional DCT coefficients, and encode information (picture type/block type), in the course of decoding the coded data for MPEG encoding process, to calculate evaluation values for recognizing the image based on the determination rules that determines the relationship between the evaluation values and the objects.

Therefore, according to the electronic apparatus 1, even when an object (for example, a pedestrian) has the size of a macro block, which makes it difficult to generate the motion vectors, the motion of the object can be detected based on the basic evaluation values LAC(lblk), LLF(lblk) and the compound evaluation values LAC_X and LLF_X, thereby enabling an accurate detection of the moving object without depending on the motion vectors.

Further, ready-made information in MPEG format is utilized for recognition of the object in the macro block that serves as a minimum unit, thereby enabling a huge reduction of processing load in comparison to the conventional technique that processes the image pixel by pixel.

Furthermore, the basic evaluation values LAC(lblk), LLF(lblk) and the compound evaluation values LAC_X, LLF_X are changed variably according to the motion of the object, thereby enabling an estimation of the object behavior and object attribute, not to mention about the existence of the object, based on the comparison of the time series of the evaluation values to the preset models.

More specifically, the electronic apparatus 1 detects an un-natural movement as a clue/lead of the abnormal behavior of the pedestrian, thereby improving the travel safety of the vehicle due to the prediction of the pedestrian movement.

In addition, the electronic apparatus 1 uses the evaluation functions and/or observation points to be evaluated variably according to the changing situations at the moment, thereby enabling an improved processing efficiency as well as an increased detection accuracy.

Furthermore, the electronic apparatus 1 uses widely-available MPEG format, thereby enabling a reduced/light processing load for utilizing the coded data of moving images that are either stored on the hard disk drives on the personal computers or acquired from the servers through the computer network.

(Other Embodiments)

Although the present invention has been fully described in connection with the preferred embodiment thereof with reference to the accompanying drawings, it is to be noted that various changes and modifications will become apparent to those skilled in the art.

For example, the electronic equipment for use in a vehicle described in the above embodiment may be replaced with other devices as long as the device utilizes the coded data with the motion-compensating prediction and the discrete cosine transform. For example, the automated MPEG image recognition on a Web server, as well as the contents description and intelligent search, and the contents filtering in a field of high definition digital broadcasting may be included in the scope of the present disclosure.

Further, it is possible to apply the present disclosure to the traffic measurement, prediction and warning based on transmission and accumulation of the image acquired from the cellular phone, the surveillance camera, the vehicle-camera and the like.

Furthermore, though the encode unit 13 in the above embodiment is assumed to have a conventional MPEG encoder or an equivalent, a processor having a reduced functionality, that is, a processor only with the functionality for extracting two dimensional DCT coefficients and encode information, may be used for achieving the above results and effects, if the image recognition is required. This is because the extraction of the coded data is not required if the purpose of the processing is image recognition only.

In the above embodiment, BEF is used to calculate the evaluation values for recognizing the pedestrian behavior and attributes. However, the BEF may be used to detect the distance to the pedestrian, and/or to determine whether the upper body, the lower body, the whole body, or only a head is captured in the image, or to calculate the certainty of those, determinations, without having distance information.

Such changes and modifications are to be understood as being within the scope of the present invention as defined by the appended claims.

What is claimed is:

1. An image recognition apparatus for recognizing an object by using encode information at one of image encoding and image decoding based on a motion-compensating prediction and a discrete cosine transformation (DCT), the apparatus comprising:
    an evaluation value calculation unit for calculating multiple kinds of evaluation values based on the encode information; and
    a determination unit for, according to a determination rule that defines relationships between (a) multiple moving objects that are to be extracted from an input image and (b) the multiple kinds of evaluation values that are calculated by the evaluation value calculation unit, determining, for each of multiple pixel blocks, which one of multiple pixel blocks corresponds to which one of the multiple moving objects, wherein
    the evaluation value calculation unit includes,
        a first evaluation value calculation unit that calculates, as one of the multiple evaluation values, a basic evaluation value based on a two-dimensional DCT coefficient derived from the discrete cosine transformation for each of the multiple pixel blocks which is used as a unit of coding, by using, as the encode information, the two-dimensional DCT coefficient based on the discrete cosine transformation;
        a second evaluation unit that calculates, as one of the evaluation values for each of specified object areas, a compound evaluation value by using an evaluation function that defines a combination method of the basic evaluation values that are calculated by the first evaluation unit; and
        a third evaluation value calculation unit that calculates, as one of the multiple evaluation values for each of the multiple pixel blocks, motion evaluation values based on a motion vector that is derived from a motion-compensating prediction which serves as the encode information, and
    the determination unit recognizes the moving object that at least includes a pedestrian and a vehicle, by determining whether an evaluation represented by a time-series model is significant based on a comparison between (a) time-series patterns of each of the evaluation values calculated by the evaluation value calculation unit and (b) predetermined time-series models,
    wherein respectively different predetermined time-series models are prepared and a behavior of the moving object that includes the pedestrian is extracted based on the predetermined time-series models and the motion evaluation values of the moving object,
    wherein the first evaluation unit calculates, as one of the multiple basic evaluation values, a sum total of alternate power components in the two-dimensional DCT coefficient.

2. The image recognition apparatus of claim 1, wherein the first evaluation unit calculates, as one of the multiple basic evaluation values, a sum total of low frequency power components in the two-dimensional DCT coefficient.

3. The image recognition apparatus of claim 1 further comprising:
    an evaluation setting unit for setting the object area, the evaluation function and the determination rule to be applied to the object area based on a determination result of the determination unit.

4. The image recognition apparatus of claim 3, wherein
    the evaluation setting unit sets, based on models of road structures and scenery for determining a scene in the input image, the object area as a high possibility area that has a higher possibility of appearance of specified type moving objects.

5. The image recognition apparatus of claim 3, wherein
    the evaluation setting unit sets the object area according to the determination result that includes positions and behaviors of the specified type moving objects, and
    the evaluation setting unit employs the evaluation function and the determination rule that are suitable for detecting a specific situation predicted for the specified type moving objects.

6. The image recognition apparatus of claim 5, wherein
    the specified type objects are pedestrians, and
    the specific situation includes at least one of an abnormal behavior and a precursor of the abnormal behavior of the pedestrians.

7. The image recognition apparatus of claim 1, wherein
    the third evaluation unit calculates, as one of the motion evaluation values, a size of the motion vector.

8. The image recognition apparatus of claim 1, wherein
    the third evaluation unit calculates, as one of the motion evaluation values, a similarity between the motion vector and a panning vector that is caused by a camera motion.

9. The image recognition apparatus of claim 1, wherein
    the third evaluation unit calculates, as one of the motion evaluation values, a similarity among the motion vectors of adjacent pixel blocks.

10. The image recognition apparatus of claim 9 further comprising:
    a fourth evaluation unit in the evaluation value calculation unit, wherein,
    after setting motion areas that are formed from consecutive pixel blocks respectively having an over-threshold motion vector similarity relative to a predetermined threshold, the fourth evaluation unit calculates, as one of the multiple evaluation values, for each of the motion areas, an area evaluation value indicative of an area size and an area shape of the motion area.

11. The image recognition apparatus of claim 1, wherein
    the determination unit determines, by comparing the evaluation value based on the two-dimensional DCT coefficient with a predetermined determination threshold, whether the evaluation value is significant or not, and
    the determination unit variably sets the determination threshold according to a frame interval between a comparison frame used in the motion-compensating prediction and a current frame.

12. The image recognition apparatus of claim 1, wherein
    the behavior model is stored in memory as a series of states in a state transition diagram, a possible behavior of the moving object is stored as a state in the state transition diagram.

13. The image recognition apparatus of claim 1, wherein
    the different pre-determined time series models are predetermined for "Pedestrian Behavior" and "Pedestrian Posture".

* * * * *